United States Patent [19]

Bagnulo

[11] 3,892,032
[45] July 1, 1975

[54] METHOD FOR FORMING CONDUITS HAVING A CONTINUOUS CORROSION-RESISTANT LINING

[76] Inventor: Luigi Bagnulo, Via Alessandro Volta No. 18, Milan, Italy

[22] Filed: Apr. 24, 1974

[21] Appl. No.: 463,780

Related U.S. Application Data

[62] Division of Ser. No. 270,571, July 10, 1972, Pat. No. 3,843,170.

[30] Foreign Application Priority Data

July 9, 1971 Italy.................................. 26857/71

[52] U.S. Cl........................... 29/455; 29/458; 29/460
[51] Int. Cl.............................................. B21d 39/00
[58] Field of Search........ 29/458, 460, 455; 285/55, 285/286

[56] References Cited
UNITED STATES PATENTS

| | | | |
|---|---|---|---|
| 2,161,155 | 6/1939 | Gettelman | 285/286 X |
| 2,273,154 | 2/1942 | Stromsoe | 29/458 UX |
| 2,324,928 | 7/1943 | Hill | 285/55 |
| 2,762,904 | 9/1956 | Thomas | 285/286 X |
| 3,325,191 | 6/1967 | Yates | 29/458 X |
| 3,490,122 | 1/1970 | Hunder et al. | 29/460 X |
| 3,516,689 | 6/1970 | Binford et al. | 285/55 X |
| 3,516,690 | 6/1970 | Kreig | 285/286 X |

*Primary Examiner*—Charlie T. Moon
*Attorney, Agent, or Firm*—Michael S. Striker

[57] ABSTRACT

A method for connecting pipe sections having a corrosion-resistant lining in which a pair of sockets are connected at small diameter ends substantially equal to the outer diameter of the pipe sections to the latter, spaced from facing ends of the pipe sections with the remainder thereof, a larger diameter portion of each socket, projecting beyond the end of the respective pipe section, in which a sleeve of a material resistant to heat and to the corrosive influence of the liquid to be conveyed is placed between adjacent ends of two pipe sections, and in which the other ends of the sockets are connected to each other by at least one weld seam which is thus radially spaced from the pipe sections and the lining thereon so that the lining is not damaged by heat during forming of the weld seam. After forming of the weld seam the space between the sockets and the pipe portions enclosed thereby is filled with a molten hardenable compound having a melting point lower than that of the pipe lining, and which, however, can not damage said lining.

8 Claims, 5 Drawing Figures

METHOD FOR FORMING CONDUITS HAVING A CONTINUOUS CORROSION-RESISTANT LINING

CROSS-REFERENCE TO RELATED APPLICATION

This is a divisional application of pending application Ser. No. 270,571, filed July 10, 1972, now U.S. Pat. No. 3,843,170.

BACKGROUND OF THE INVENTION

It is known that metallic conduits which convey corrosive fluids are subjected to corrosion at their inner surfaces and it is customary in order to prevent such corrosion to provide an internal coating for such conduits, i.e., a coating of varnish or resin capable of withstanding the corrosive action of the fluids.

Usually, such elongated conduits are made from pipe sections which are connected at facing ends by welding to each other and during such welding, the coating at the internal surfaces of the pipe sections is destroyed by the heat necessary for forming the weld seam. In such pipe sections connected to each other by welding, there will therefore be formed annular strips at each weld seam which is free of coating or in which the coating is at least partially destroyed so that corrosion will take place at each weld seam. In order to overcome such drawback, attempts have been made to coat the above-mentioned annular strips by conventional methods after completion of the welding operation.

Such an approach, however, is time-consuming and extremely expensive, so that other methods have been suggested such as described, for instance, in the Italian Pat. No. 792,945 and its patent of addition No. 829,510 which provide for a cathodic protection of the uncoated area by means of reactive anodes. This method, however, has only a limited efficiency and since reactive anodes of a great wall thickness cannot be used, the useful life of such anodes is extremely short.

SUMMARY OF THE INVENTION

It is an object of the present invention to provide a method for producing an elongated metal conduit for conveying corrosive fluids by welding metal pipe sections provided at the inner surface thereof with a corrosion-resistant coating or lining.

It is an additional object of the present invention to provide for a method of forming such conduits in which the internal lining of the metal pipes is not partially destroyed or damaged during connecting of the pipe sections by welding.

With these and other objects in view, which will become apparent as the description proceeds, the method according to the invention of connecting metal pipe sections to form a continuous conduit for conveying corrosive liquids therethrough, mainly comprises the steps of integrally connecting a pair of sockets respectively at one end to each pipe section spaced from the respective end of the latter, with the other end of each socket projecting beyond the respective pipe end, in which the afore-mentioned one end has an inner diameter substantially equal to that of the outer diameter of the respective pipe section while the remainder thereof has a greater inner diameter. Subsequently thereto, a corrosion-resistant coating is provided on the inner surface of each pipe section covering also the end faces thereof and at least part of the outer surface located within the socket. A sleeve of a material resistant to heat and the corrosive influence of the liquid to be conveyed is placed between the ends of two pipe sections and the other ends of the sockets are connected, by means including at least one weld seam, to each other whereby damage to the coating by the heat during forming of the weld seam is prevented due to the radial distance of the weld seam from the coating. The sleeve preferably has a portion located beneath the weld seam to further protect the coating during the welding operation. Preferably, the space between the inner surface of the thus joined sockets and the portions of the pipe sections enclosed thereby is filled with a molten hardenable compound having a melting point lower than that of the coating, and which, however, can not damage said coating.

The arrangement for connecting opposite ends of metal pipe sections to form a continuous conduit adapted to convey corrosive liquids in which the metal pipe sections are provided with a corrosion-resistant coating at the inner surface thereof which covers also end faces of the pipe sections and part of the outer surfaces thereof adjacent end faces, mainly comprises according to the invention a pair of sockets, one for each pipe, in which each socket has at one end an inner diameter substantially equal to that of the outer diameter of the respective pipe section and being fixed at the aforementioned one end to the respective pipe section spaced from the end face of the latter and projecting with the remainder thereof having a greater diameter than that at said one end beyond the end face of the respective pipe section. At least one sleeve of a material resistant to heat and to the corrosive influence of the liquid to be conveyed is placed between the end faces of the pipe sections and the other ends of the sockets are connected by connecting means including at least one weld seam to each other. The arrangement preferably includes also a hardenable compound filling the space between the inner surface of the sockets and the portions of the pipe sections enclosed thereby, in which this compound has a melting point lower than that of the coating, and which, however, can not damage said coating.

The continuous coating thus obtained may be further protected, if the conduit has to convey particularly aggressive liquids which have a high conductivity, such as sea water, by providing within the conduit reactive anodes spaced considerable distances in axial direction of the conduit from each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
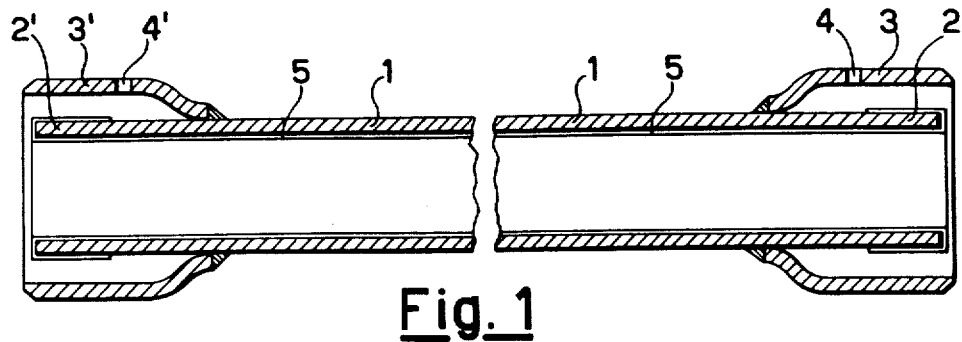
FIG. 1 is an axial cross-section through a pipe section with sockets provided in the region of opposite ends thereof.

FIG. 1 illustrates in axial cross-section a metal pipe section 1 to be used for forming a continuous conduit for the conveyance of corrosive fluids, and the pipe section 1 is provided along the entire inner surface thereof with a corrosion-resistant coating 5 formed, for instance, of varnish or resin. As shown in FIG. 1 the coating 5 extends also about opposite end faces of the pipe section 1 and about part of the outer surface adjacent the end faces. As further shown in FIG. 1 a pair of sockets 3 and 3' are connected at small diameter ends thereof substantially equal to the outer diameter of the pipe section 1, for instance by welding to the latter while projecting with the remainder thereof having a larger diameter than the outer diameter of the pipe section slightly beyond opposite end faces of the latter. Each of the sockets is provided in the wall thereof with a bore 4 and 4' respectively, for a purpose as will be explained later on. It is mentioned that in making the pipe section with the socket thereon as shown in FIG. 1, the sockets are first welded at the small diameter ends to the pipe section before the coating 5 is formed on the latter, so that such coating will not be partially destroyed by welding the small diameter ends of the sockets to the pipe section.

Figures 2, 3:
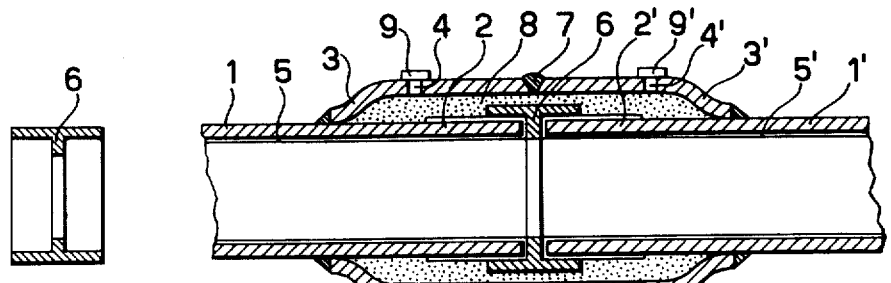
FIG. 2 is an axial cross-section through a sleeve to be placed between adjacent ends of opposite sections.
FIG. 3 is an axial cross-section through a welded joint of adjacent ends of pipe sections.

In order to connect two pipe sections as shown in FIG. 1 at adjacent aligned ends to each other, a sleeve 6 of a material resistant to heat and the corrosive influence of the fluid to be conveyed is placed between adjacent end faces of two pipe sections 1 and 1' as shown in FIG. 3, and as shown in FIGS. 2 and 3 each of the sleeves 6 has a radially inwardly projecting annular web which is located between the coatings on adjacent end faces of the two pipe sections 1 and 1' whereas the remainder of the sleeve 6 overlaps the outer coatings on adjacent ends of the pipe sections. The sockets 3 and 3' respectively connected to the adjacent ends of the pipe sections 1 and 1', are then welded to each other by a weld seam 7 and during such welding the coatings 5 and 5' provided will not be damaged since the weld seam 7 is radially outwardly spaced from the coatings. If necessary, the inner space enclosed by the sockets 3 and 3' may also be cooled in any convenient manner during the welding operation. The coatings are also protected from any welding material dropping within the space enclosed by the sockets by the sleeve 6 which has a portion located beneath the weld seam.

After the adjacent socket ends and thereby the adjacent ends of the two pipe sections 1 and 1', have thus been connected by a weld seam 7, the space enclosed by the sockets 3 and 3' is filled through one of the openings 4 or 4' with a molten compound 8 having a lower melting point than that of the coatings 5 and 5' and which, however, can not damage said coatings whereby the other of the openings in the sockets serves as a vent opening. After filling of the aforementioned space with the compound 8, the openings 4 and 4' are closed by plugs 9 and 9'. In the embodiment shown in FIG. 3, the sockets respectively provided in adjacent end portions of two pipe sections 1 and 1', are directly connected by a single weld seam 7.

While the sleeve 6 is shown in FIGS. 2 and 3 as a one-piece sleeve, it is also possible to make the sleeve 6 of two separate pieces each of which is fixed after the pipe sections 1 and 1' have been coated onto the end portions 2 and 2' thereof. Such an expedient will also serve to protect the coatings 5 and 5' of the pipe sections during shipping of the latter. When it is desired to maintain the entire internal surface of the conduits made according to the present invention under cathodic protection, the sleeve may be made of reactive material such as zinc. In such a case, the outer diameter of such a sleeve of reactive metal may be covered by a thin sleeve of steel of an outer diameter such to engage with a snug fit the inner diameter of the sockets 3 and 3' in such a manner that a metallic continuity may be created during welding of the sockets between the latter and the reactive metal sleeve. In order that the welding heat does not damage in this case the coating on the ends 2 and 2' of the pipe sections, these ends should be cooled during the welding with any convention means, or the outer diameter of the reactive sleeve could be also made sufficiently smaller than the inner diameter of the sockets 3 and 3', and the electric continuity between the sockets and the reactive sleeve may in this case be provided by an appropriate metal conductor. The length of the reactive sleeve may be varied according to the requirements within a certain range by correspondingly extending the ends of sockets 3 and 3' beyond the end faces of the pipe sections to be joined.

Such reactive sleeves may be placed at each joint of adjacent ends of two pipe sections or only at certain joints of successive pipe sections which are spaced a considerable axial distance from each other.

Figure 4:
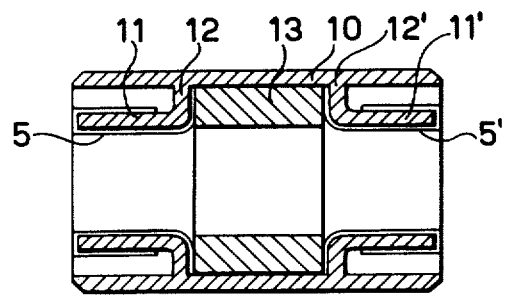
FIG. 4 is an axial cross-section through aa connecting member including a reactive anode for joining adjacent ends of pipe sections.

In certain cases where it becomes necessary to use a very long reactive sleeve, a special connecting member as shown in FIG. 4 is preferably used. As shown in FIG. 4, the connecting member 10 formed from metal, for instance steel, comprises an outer tubular wall portion and a pair of inner tubular wall portions 11 and 11' connected at spaced ends thereof by radially extending annular web portions 12 and 12' to the outer tubular portion and the inner tubular wall portions 11 and 11' are provided with a corrosion-resistant coating 5 and 5' in a manner as shown in FIG. 4. In the annular space between the web portions 12 and 12', an annular member 13 of reactive metal is located to provide cathodic protection to the inner surface of the conduit produced by connected pipe sections in which the connecting member 10 above-described is used. The reactive metal from which the annular member 13 is formed, may be constituted by zinc or, when it is desired to use a greater voltage and current for the cathodic protection, the member 13 may be formed from platinum-coated titanium and connected through an insulated electric conductor to a source of direct current.

Figure 5:
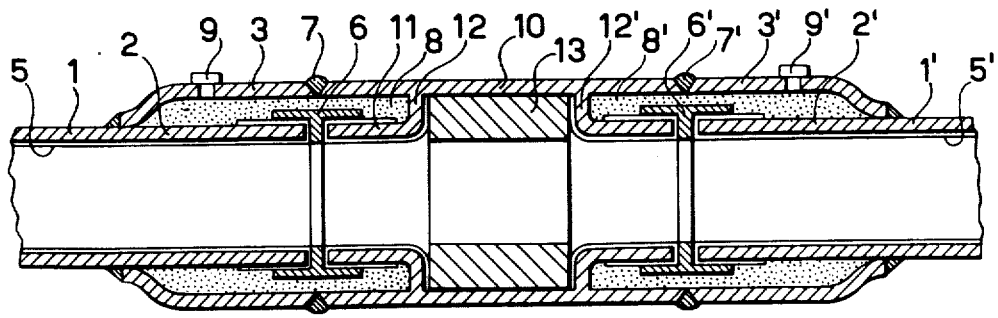
FIG. 5 is an axial cross-section of a joint of adjacent ends of pipe sections using a connecting member as shown in FIG. 4.

The use of such a connecting member 10 as described above in the connection of two pipe sections 1 and 1' to each other, is shown in FIG. 5. As shown therein, each of the pipe sections 1 and 1' is provided with a coating 5 and 5' in the manner as described before and a sleeve 6 as illustrated in FIG. 2 is placed on the corresponding end of each pipe section. The ends of each pipe section are again provided with sockets 3 and 3' in the manner as described above in connection with FIG. 1. The connecting member 10 is then placed in the manner as clearly shown in FIG. 5 between the sleeve 6 and the opposite ends of the sockets 3 and 3', whereafter the outer wall portion of the connecting member 10 and the free ends of the sockets 3 and 3' are respectively connected by weld seams 7 and 7' which are again radially spaced from the linings 5 and 5' on the pipe sections and on the inner wall portions of the connecting member 10 so that such coatings will not be damaged by the heat produced during forming of the weld seams. The free spaces enclosed between the sockets 3 and 3', the inner wall portions of the connecting member 10 and the end portions 2 and 2' of the pipe sections are then filled with a molten hardenable compound 8 and 8', which as mentioned before has a melting point lower than that of the coatings. After the aforementioned spaces have been filled by the compound, the filling openings are again closed by plugs 9 and 9'.

It will be understood that each of the elements described above, or two or more together, may also find a useful application in other types of methods for connecting metal pipe sections having a corrosion-resistant coating on the inner surface thereof by weld seams without damaging the coating, differing from the types described above.

While the invention has been illustrated and described as embodied in a method for connecting metal pipe sections having a corrosion-resistant coating on the inner surface thereof by weld seams without damaging the coating, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be protected by Letters Patent is set forth in the appended claims:

1. A method of connecting metal pipe sections to form a continuous conduit for conveying corrosive liquids therethrough comprising the steps of integrally connecting a pair of sockets respectively at one end to each pipe section spaced from the respective end of the latter with the other end of each socket projecting beyond the respective pipe end, each of said sockets having at said one end an inner diameter substantially equal to that of the outer diameter of the respective pipe section and at the remainder thereof a greater inner diameter; providing a corrosion-resistant coating on the inner surface of each pipe section which covers also the end faces thereof and part of the outer surface located within the socket; providing a sleeve of a material resistant to heat and to the corrosive influence of the liquid to be conveyed between facing ends of two pipe sections; and connecting the other ends of said sockets by at least one weld seam, said sleeve having a portion located inwardly of said weld seam, whereby damage to the coating by the heat during forming of the weld seam is prevented.

2. A method as defined in claim 1 and including the step of forming a hole in each socket and filling the space between the inner surface of said sockets and the portions of the pipe sections enclosed thereby with a molten hardenable compound having a melting point lower than that of said coating, and which, however, can not damage said coating.

3. A method as defined in claim 1, wherein said other ends of said sockets are directly connected to each other by said weld seam.

4. A method as defined in claim 1 and including the steps of placing a sleeve on each of the facing end faces of two pipe sections and placing a connecting member between said sleeves and the other ends of said sockets connected to said two pipe sections, said connecting member having an outer tubular wall portion with a diameter substantially equal to that of said other ends of said socket and inner tubular wall portions connected to said outer tubular wall portion and having each a diameter substantially equal to that of said pipe sections, and wherein the step of connecting said other ends of said sockets comprises the step of connecting the outer tubular wall portion at opposite ends by weld seams to said other ends of said sockets.

5. A method as defined in claim 4, and including the step of forming a hole in each socket and filling the space between the inner surfaces of said sockets and the portions of the pipe sections enclosed thereby, as well as the space between the outer and inner wall portions of said connecting member with a molten hardenable compound having a melting point lower than that of said coating.

6. A method as defined in claim 5, wherein said inner wall portions of said connecting member are connected axially spaced from each other to said outer wall portion, and including the step of providing an annular member of reactive metal in the space between said inner wall portions to provide cathodic protection to the inner surface of said conduit.

7. A method as defined in claim 6, wherein said annular member is made of zinc.

8. A method as defined in claim 6, wherein said annular member is made of platinum-coated titanium.

* * * * *